(12) United States Patent
Chadbourne (10) Patent No.: US 11,067,294 B1
(45) Date of Patent: Jul. 20, 2021

(54) SYSTEM TO COLLECT, STORE AND DISTRIBUTE HEAT ENERGY FOR A MULTI-UNIT BUILDING

(71) Applicant: Mark A. Chadbourne, Old Town, ME (US)

(72) Inventor: Mark A. Chadbourne, Old Town, ME (US)

( * ) Notice: Subject to any disclaimer, the term of this patent is extended or adjusted under 35 U.S.C. 154(b) by 0 days.

(21) Appl. No.: 16/732,815

(22) Filed: Jan. 2, 2020

(51) Int. Cl.
  *F24D 11/00* (2006.01)
  *F24D 11/02* (2006.01)
  *F24S 23/77* (2018.01)

(52) U.S. Cl.
  CPC ........ *F24D 11/003* (2013.01); *F24D 11/0221* (2013.01); *F24S 23/77* (2018.05); *F24D 2200/14* (2013.01)

(58) Field of Classification Search
  CPC ............... F24D 11/003; F24D 11/0221; F24D 2200/14; F23S 23/77
  See application file for complete search history.

(56) References Cited

U.S. PATENT DOCUMENTS

| 8,474,445 | B2* | 7/2013 | Fairstein | F24S 80/54 126/600 |
| 9,404,673 | B2* | 8/2016 | Swift | F24S 10/00 |
| 9,541,307 | B2* | 1/2017 | Jackman | H02S 40/44 |
| 2009/0199892 | A1* | 8/2009 | Farquhar | F24S 60/10 136/248 |
| 2010/0326424 | A1* | 12/2010 | Bennett | F24S 30/428 126/600 |
| 2011/0174294 | A1* | 7/2011 | Adel | F24S 23/77 126/601 |
| 2019/0386605 | A1* | 12/2019 | Pao | F24S 25/61 |

* cited by examiner

*Primary Examiner* — David J Laux
*Assistant Examiner* — Nikhil P Mashruwala
(74) *Attorney, Agent, or Firm* — Anthony D. Pellegrini (57) ABSTRACT

A system for collecting solar energy to be stored and distributed in a multi-unit building to be used for heat and electricity, comprising one or more solar energy collectors, one or more sunlight concentrating mirrors, photovoltaic panels, a heat mass storage area, and thermos siphoning to distribute heat energy throughout the building in conjunction with radiant heating technology.

19 Claims, 12 Drawing Sheets

SYSTEM TO COLLECT, STORE AND DISTRIBUTE HEAT ENERGY FOR A MULTI-UNIT BUILDING

CROSS REFERENCE TO RELATED APPLICATION

This application claims the benefit of provisional application, U.S. Ser. No. 62/788,021, filed Jan. 3, 2019, entitled SYSTEM FOR ENERGY CAPTURE, STORAGE, AND DISTRIBUTION, by Chadbourne, Mark A., which is hereby incorporated by reference.

BACKGROUND OF THE INVENTION

Our modern lifestyle based on fossil fuels places much carbon dioxide in the atmosphere thus warming the planet and disrupting the standard weather patterns, sea level, etc. Alternative sources of power have their own problems. Nuclear power risks leaving portions of the land unusable for hundreds, if not thousands, of years. Hydro and wind power interfere with fish and bird migration. Batteries rely on toxic compounds. Water based solar collectors are the most ecologically benign and efficient heat producers.

It is therefore an object of the present invention to provide a system to collect, store and distribute solar heat energy for a multi-unit residential building in which passive solar energy capture is the predominant means of obtaining heat energy.

SUMMARY OF THE INVENTION

The intent of the invention disclosed herein is to provide a system to collect solar energy and store and distribute heat energy for a multi-unit building located at approximately 45 degree latitude. Structures other than multi-unit buildings are also contemplated as being subject to use of the system of the present invention. In this situation, heating in the winter is a greater issue than cooling in the summer and general power requirements. The main collectors would be angled at 20 to 30 degrees above the horizontal to optimize the collection of winter sunlight.

The building would also have a photovoltaic (PV) system for air conditioning and some power requirements. Photovoltaic systems are well known in the art. They typically comprise an array of semiconductor chips which convert incident sunshine to direct current electricity. These chips are covered with glass and backed with plastic. They are usually installed with an electronics package that converts the power to alternating current and interfaces with the power grid. The PV system of the present invention will be attached to the electrical grid for general power requirements. As battery technology improves a PV system with batteries may supplant the grid.

The invention uses natural building components, concentrating mirrors, geometry, low grade storage and distribution and passive controls to reduce costs and losses.

In order to properly describe the present invention, it is useful to set forth the problems arising from the current state of the art. These include:

1. Tracking. The sun moves relative to the collector from hour to hour and season to season. A fixed collector misses a portion of available energy at some times of day and some times of year. Tracking doubles the expense of the collector.

2. Solar energy is diffuse. This leads to the necessity of having a large collector to receive any significant amount of energy.

3. Temporal offset between production and usage. Solar energy can only be collected during the day, while heat is also needed at night. Also, more solar energy is available in the summer while more heat is needed in the winter. While storage from day to night is achievable, storage from summer to winter is a challenge due to storage size and standby losses.

4. Storing enough heat collected in the summer to heat a building through the winter would require a massive storage system. This is economically challenging.

5. A high temperature storage system might be a tradeoff to a large storage system. In addition to the issues with producing high temperatures with solar, this increases the need of insulation and thus expense. Ultimately, no practical amount of insulation will prevent near total heat loss in a summer to winter storage system.

6. Control systems add cost.

Solutions to the above-stated problems include the following:

1. The main collectors are used in the late fall and winter, thus they will be fixed at an angle of 20 or 30 degrees above the horizon facing due south. Since the sun tracks rather horizontally during the middle part of the day at this time of year, this will be optimum for the winter sun from 9 or 10 am to 2 or 3 pm. The collectors will be arrayed the length of the building.

2. Mirrors are used to double or triple the amount of sunlight impacting the collector. This will require the use of evacuated tube collectors, so the mirrors can be behind the collectors and reflect light on the back side of the collectors. Evacuated tube collectors are made up of concentric tubes (i.e., a smaller diameter tube encased in a larger diameter tube). The tubes are often made of glass, and the space between the two tubes is evacuated to insulate the inner tube. These tubes are typically 48" to 96" long, with an outer tube diameter of 4" and in inner tube diameter of 1", but dimensions may vary. Alternately, Flat Plate collectors may be used instead of (or in conjunction with) evacuated tube collectors. Flat Plate collectors are made up of black copper tubes covered with glass and backed with insulation. The glass traps heat with the greenhouse effect and the insulation reduces heat loss from the back. Water pumped through the tubes transports heat to a storage system. Flat Plate panels are typically built to a 96"×96"×4" dimension, but these dimensions may be varied.

Figure 1:
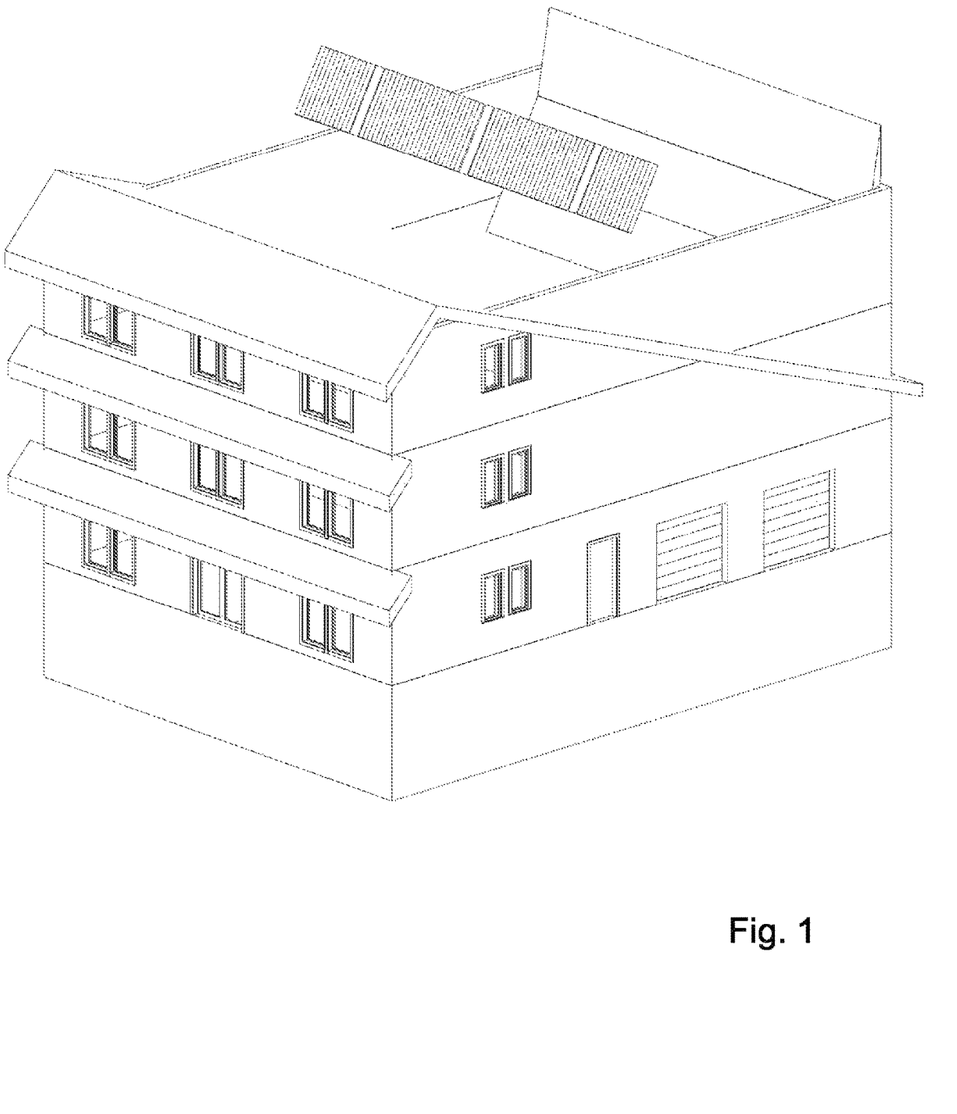
FIG. 1 is a perspective representation of the system implemented as a multi-unit residential housing facility.
Figure 2:
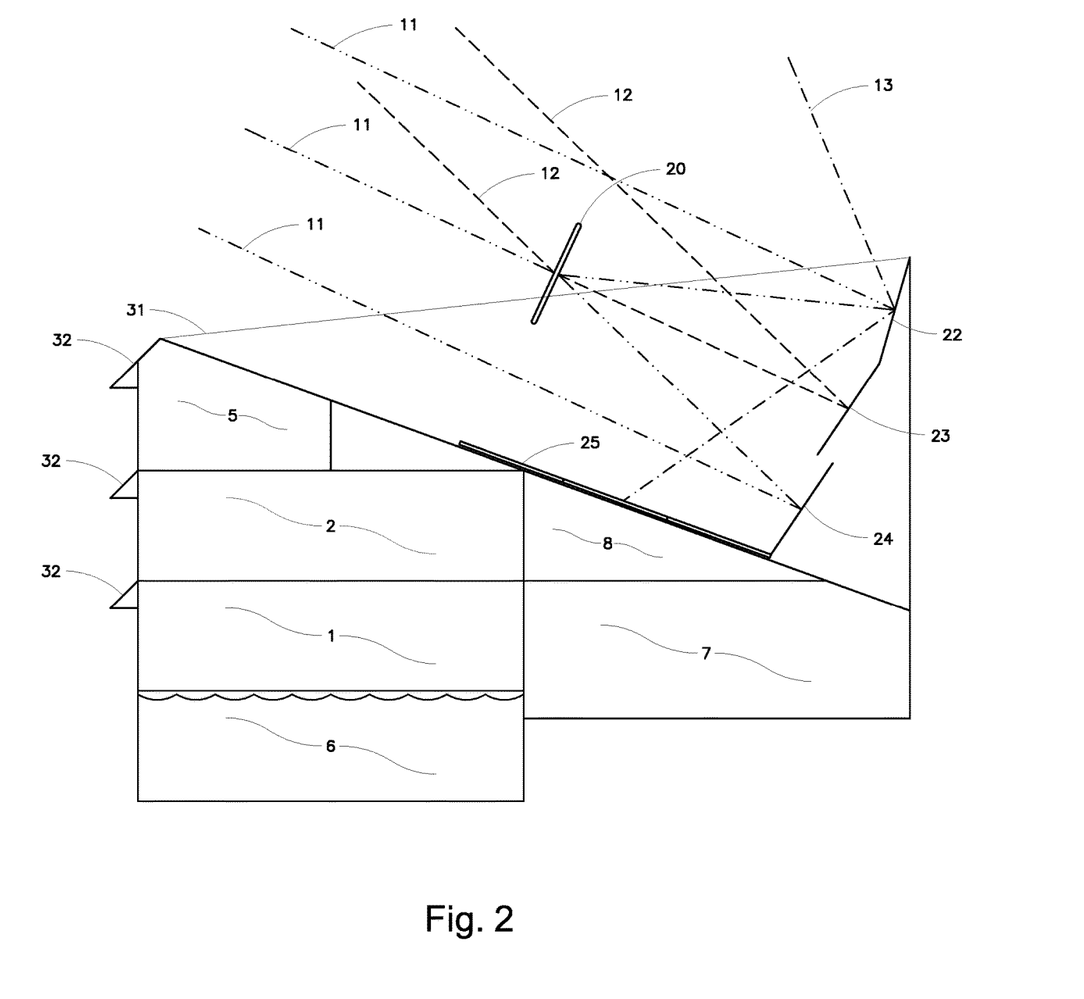
Figure 3:
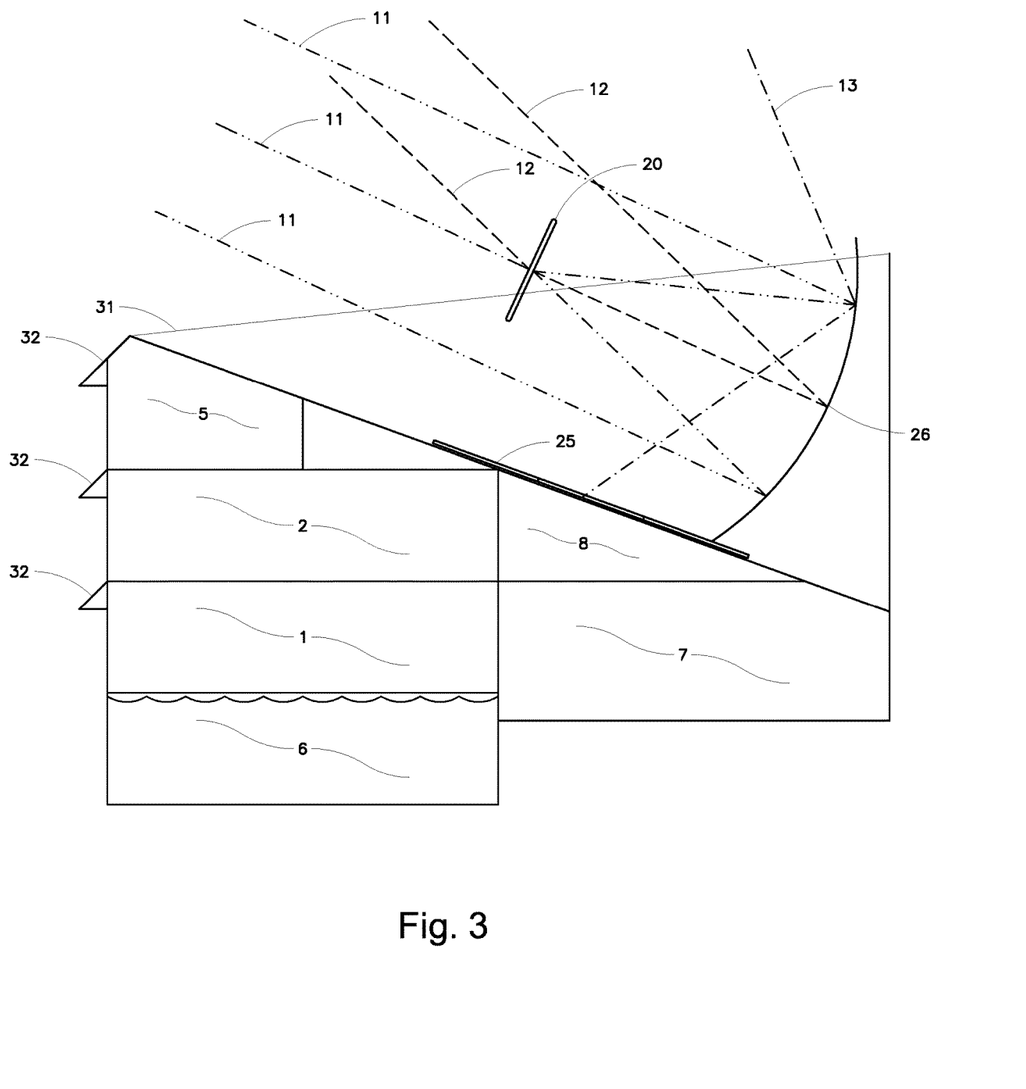
FIG. 3 depicts the system shown in FIG. 2 but with the upper, middle, and lower flat mirrors 22,23,24 replaced by a single concave mirror 26.
Figure 4:
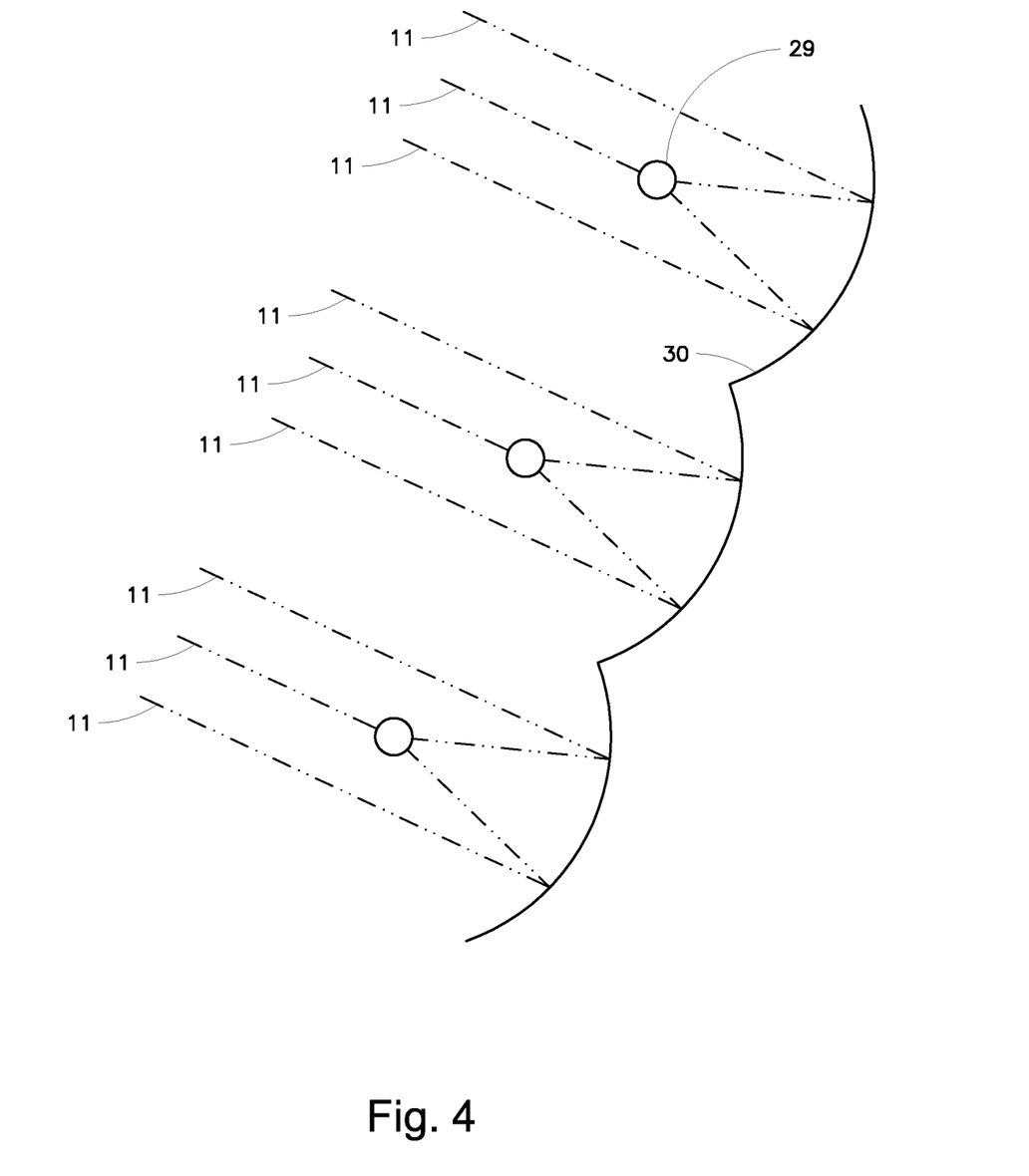
FIG. 4 is a side view representation of the system showing a series of evacuated tube collectors 29 oriented horizontally and each aligned with the middle of a smaller concave mirror 30. Winter sun rays 11 are reflected by the mirrors 30 onto the collectors 29.
Figure 5:
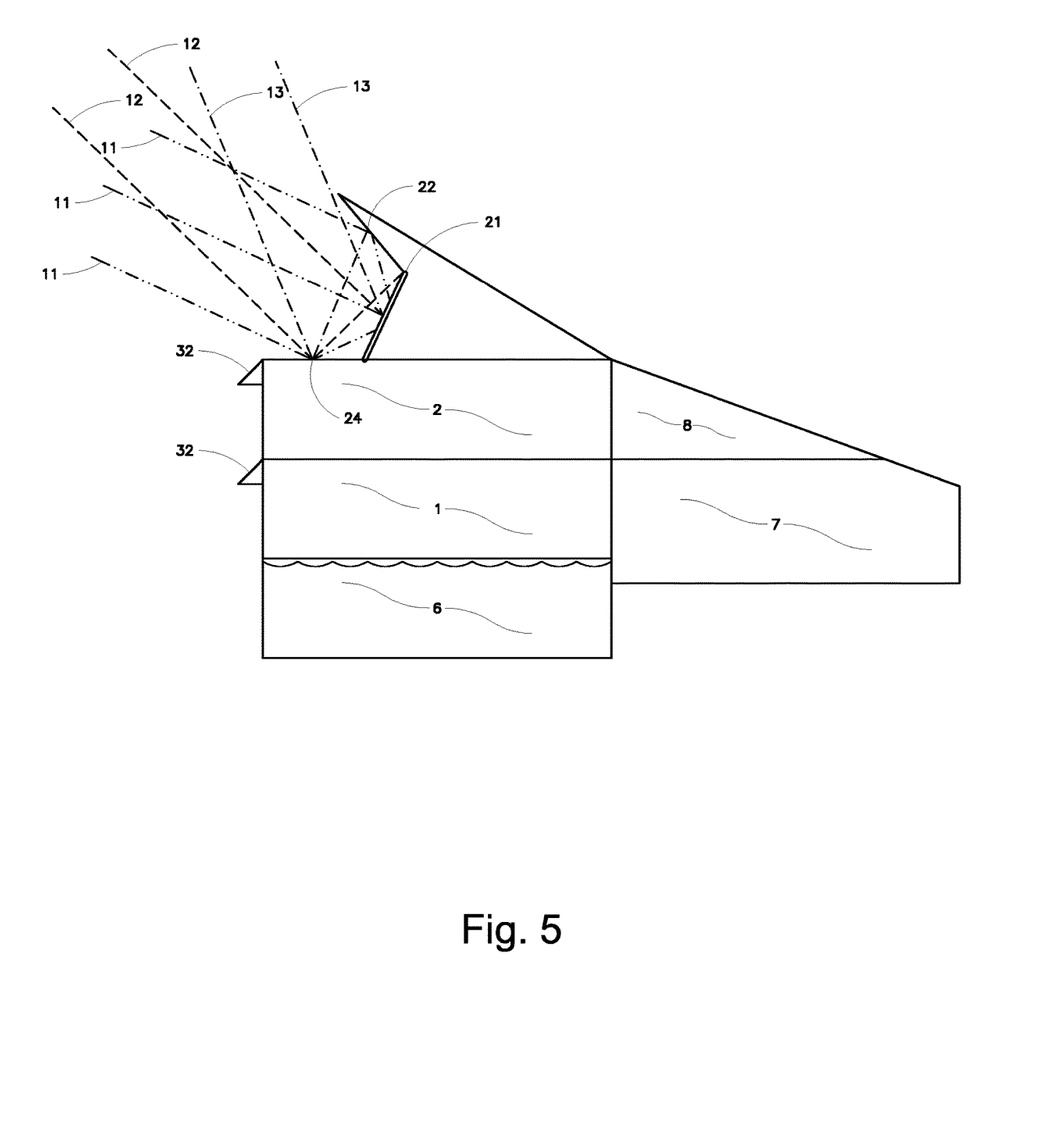
FIG. 5 is an alternate representation of the system shown in FIGS. 1, 2, and 3, whereby a flat plate collector 21 is used and only the upper mirror 22 and lower mirror 24 are used.
Figure 6:
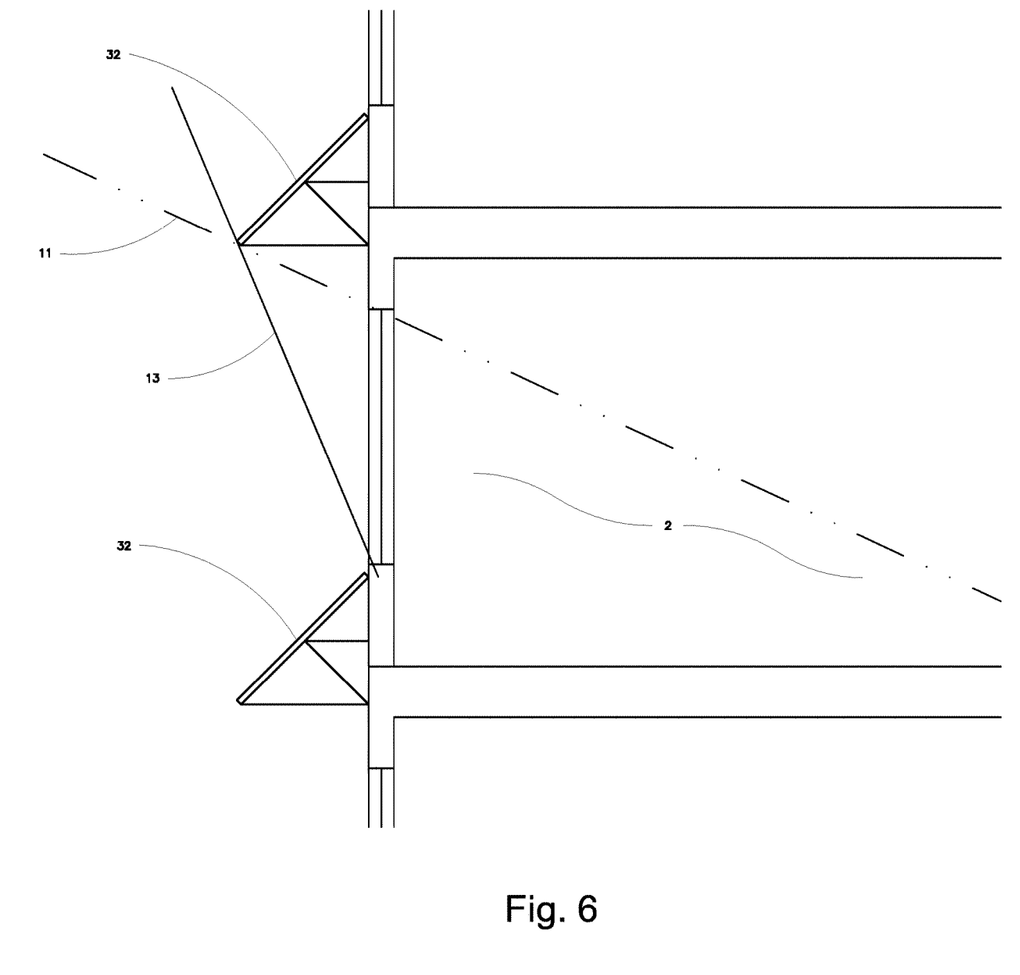
FIG. 6 is a close up side view of the representation of the system shown in FIG. 1, whereby the photovoltaic sunshades 32 are seen blocking the summer sun rays 13 but allowing the winter sun rays 11 to pass through the window of the living unit 2.
Figure 7:
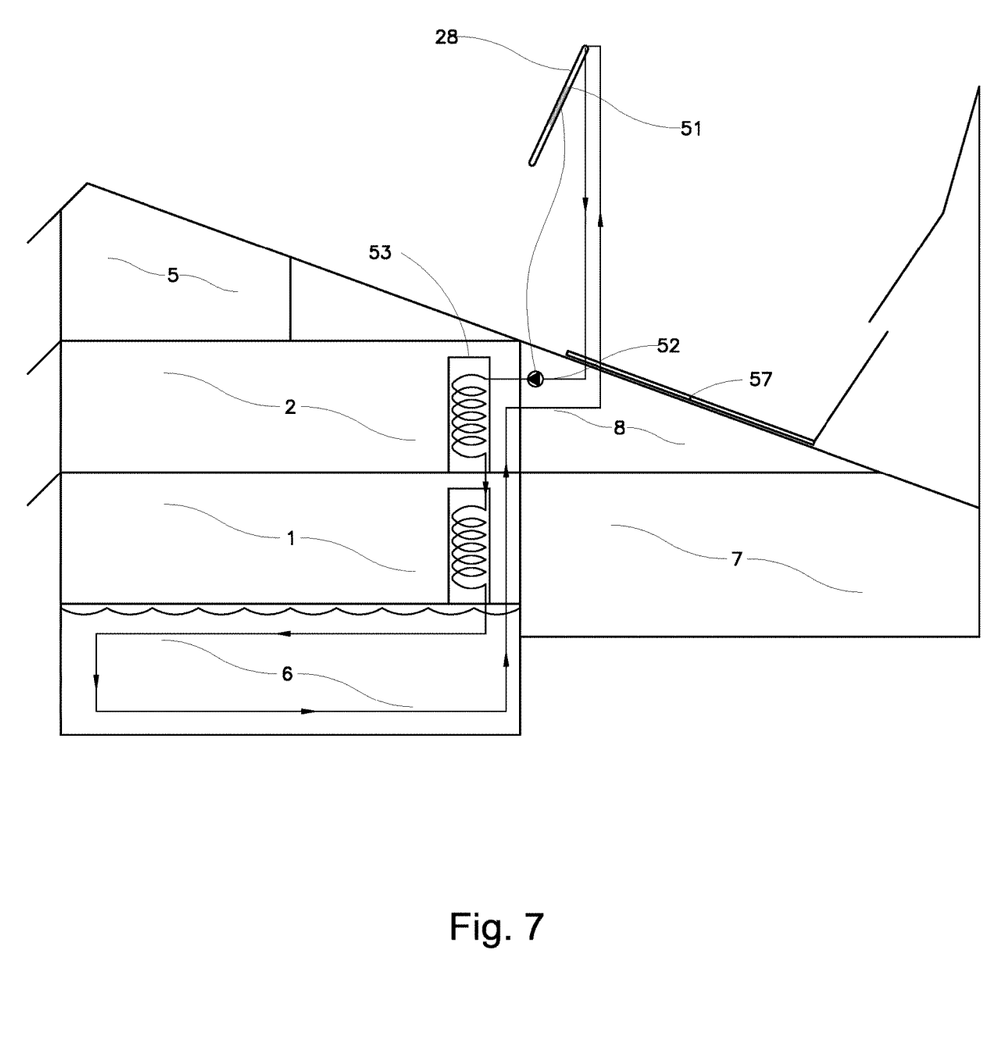
Figure 8:
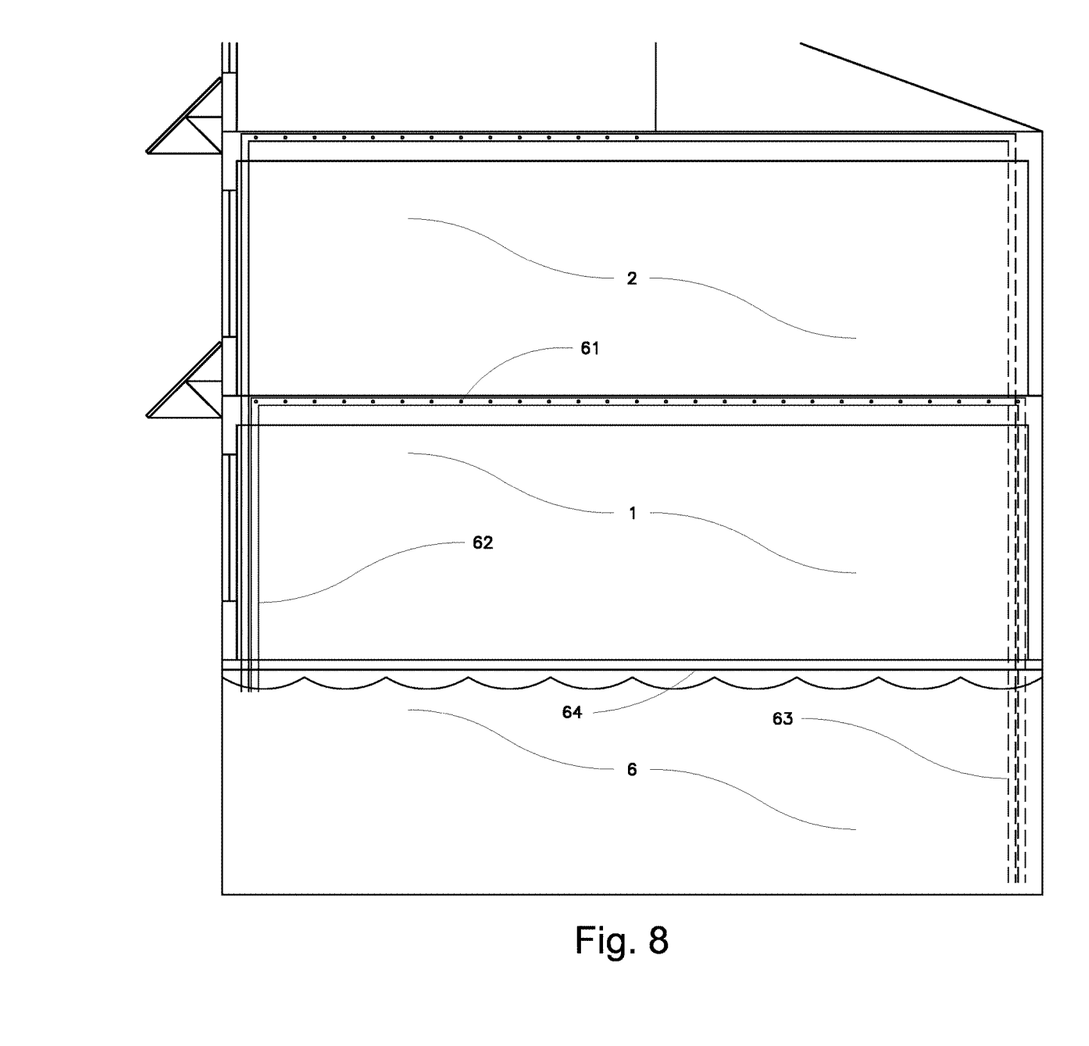
Figure 9:
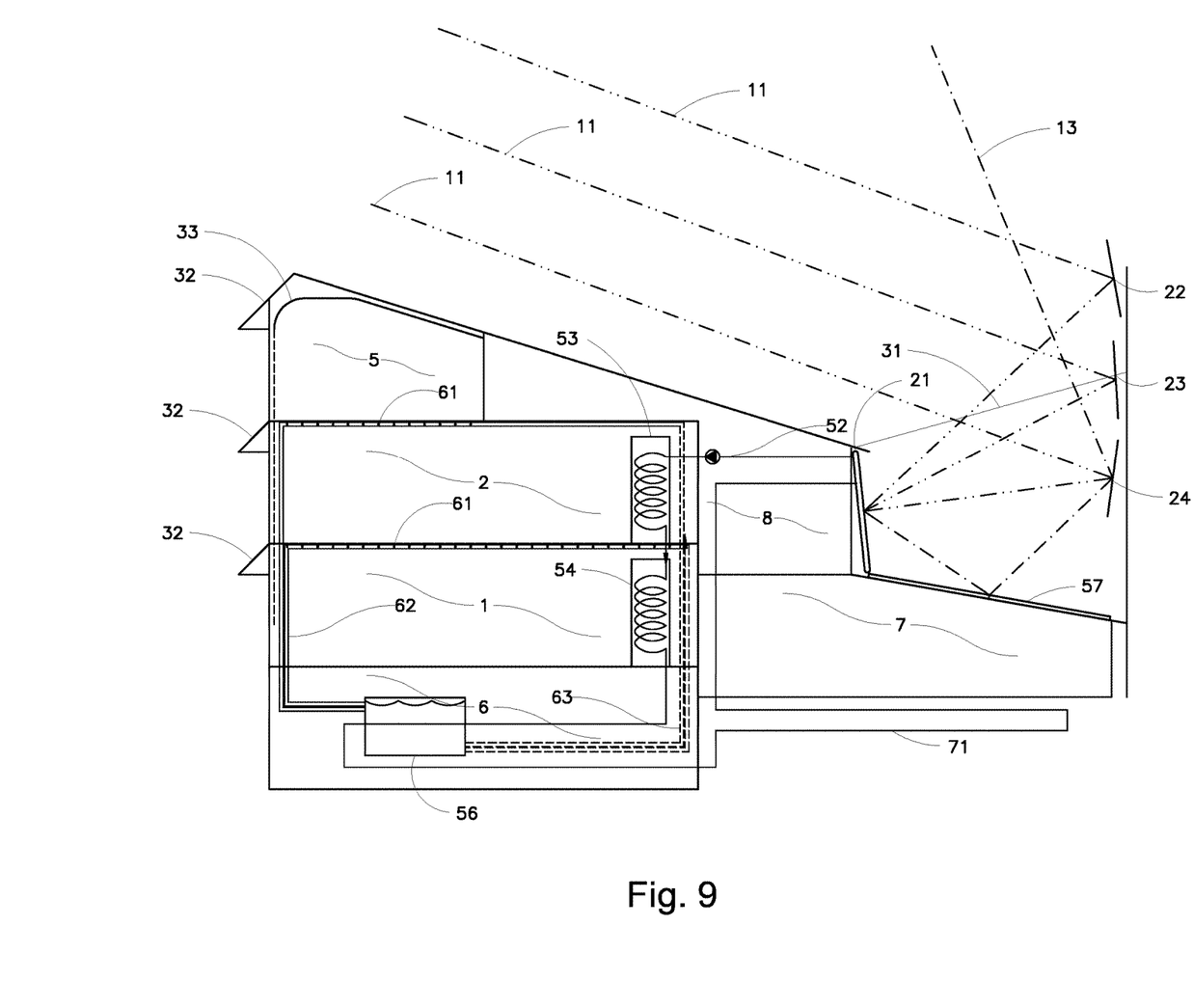
Figure 10:
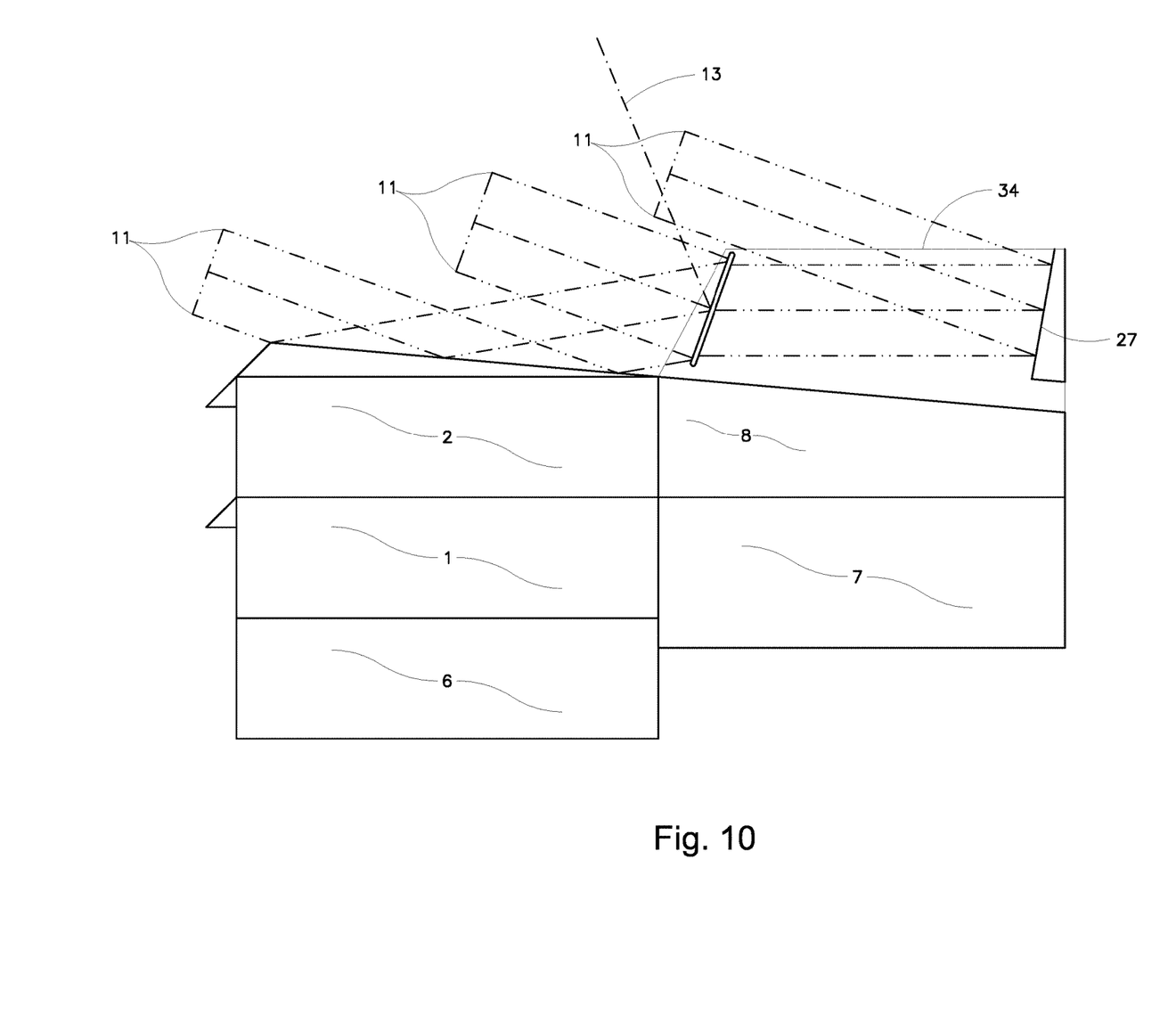
FIG. 10 is a side view cut-away representation of yet another embodiment of the system. A flat mirror 27 is positioned on the roof to direct sunlight onto a collector. A mirrored side wall 34 prevents concentrated sunlight from being dispersed.
Figure 11:
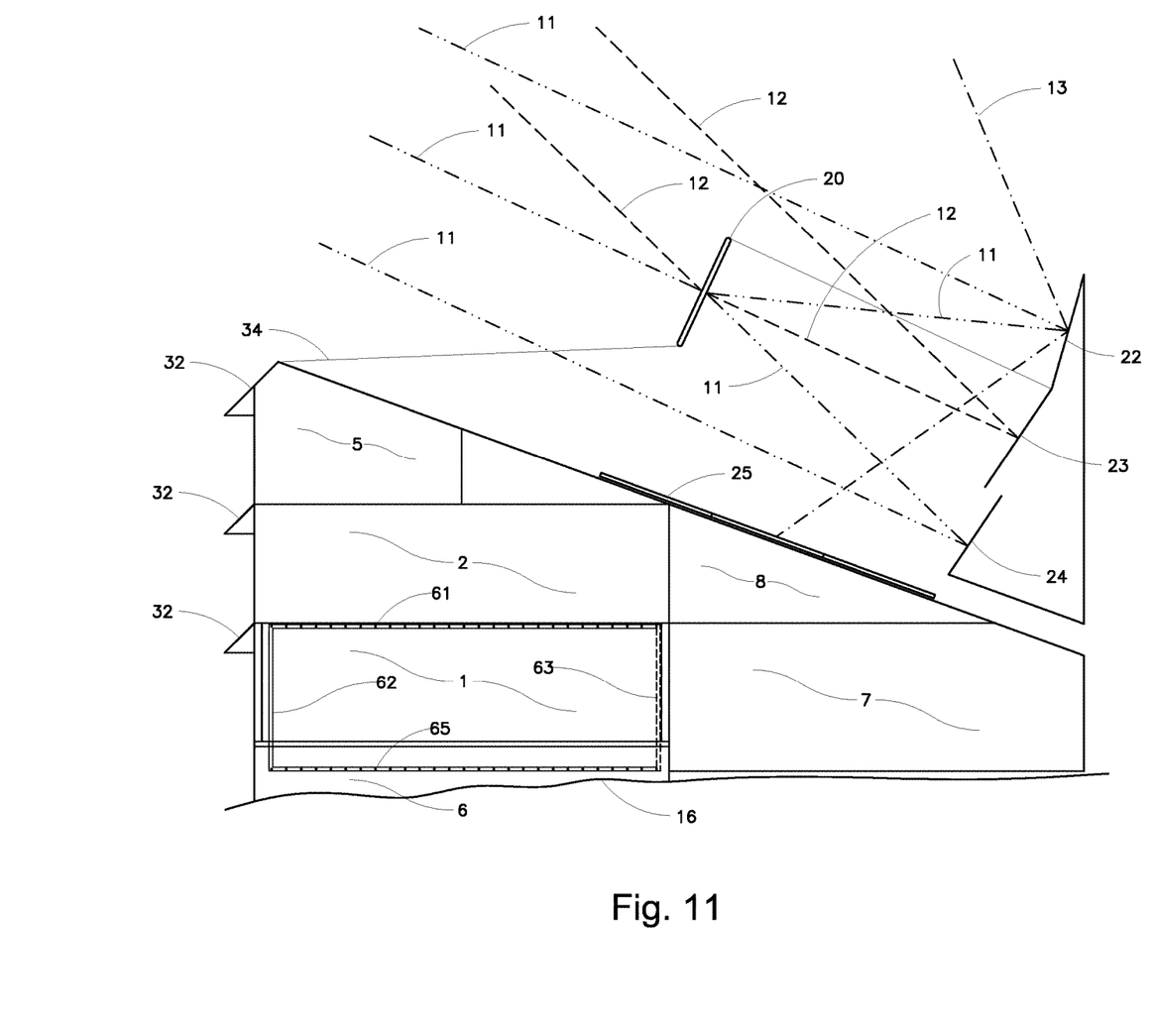

Since the sun tracks rather horizontally during the middle part of the day this geometry will be maintained to a large degree through the brightest part of the day. The mirrors will be oriented such that two mirrors will be focused on the collectors for solar elevations of about 25 degrees. The middle mirror, which is in the shade of the collector when the sun is at 25 degrees, will be angled such that sunlight that it receives from above the collector (Spring and Fall) will be reflected toward the collector. Amongst the collectors, facing both the sun and mirrors, PV panels will provide power to pump heat into the storage system. In the summer the mirrors might be folded or covered to deactivate, or PV collectors could be placed on the roof where the mirrors focus. This might provide significant power in May, June and July. Additional geometries are also contemplated. See FIGS. 9 and 10. In these geometries, a portion of the collector/mirror may be adjustable to increase fall collection or to reduce spring and summer collection. Structural walls at 10-20' on center may help support the collectors and mirrors without roof penetrations. See FIGS. 10 and 11.

The collector and mirror can be located on the lower part of the roof or can be slid anywhere up and down the roof.

If it is moved up the roof wind loads would increase making it a more expensive structure. On the other hand, the mirror or mirror and collector could be mounted on the ground behind the building. This would increase the foot print and perhaps obstruct things on the ground.

Other geometries might also be helpful. A concave mirror, rather than a facetted mirror, might focus the reflected sunlight to a smaller area, thus keeping the reflected sunlight on the collector with greater vertical movement of the sun. One question is whether the collector can tolerate the focused sunlight. Another approach would be to orient the collector horizontally in the middle of a smaller concave mirror. The radius of the mirror would have to be large enough that the shadow of the collector was a minor part of the mirror and small enough that the focused sunlight remained on the collector as the sun moves vertically during the day. Another geometry would be to have the mirrors above and below, and in front of, the collector, such that sunlight hitting the mirrors would be directed toward the collector. This arrangement may collect snow. In another embodiment, a Flat Plate collector may be placed on the north side of the building with mirrors reflecting sunlight back to it.

3. Rather than collecting heat in the summer, heat will be collected while the sun is at its seasonal lowest to be used during the seasonal coldest. The winter solstice is December 21 while the middle of the heating season is January 21, a one month lag. Thus heat needs to be stored for a month rather than 6 months.

4. The basement may be filled with water, to be used as the storage system. It will be insulated on the outside to include the concrete in the thermal mass. It could also be filled with stone, block, etc., to further increase the thermal storage capacity. (Rock and concrete have roughly five times the thermal mass of water.) The water would then primarily function as the distribution medium. In cold climates a 5 or 6 foot deep foundation is a necessary part of the structure. Alternatively, rather than use a large water thermal storage, a slab on grade might be used. The gravel under the slab would greatly increase the thermal mass, while a small water tank might be imbedded in the gravel to serve the upper floors. See FIG. 9. A shallow foundation on ledge might serve the first floor with alternate heating for the second floor. An array of pipes with a manifold could be used to extract heat from the thermal storage to radiate to the second floor. See FIG. 11.

5. To minimize standby losses the storage system will be low temperature (on the order of 100 degrees F.). This will require a low temperature heating system such as a radiant slab. To minimize distribution costs it will be gravity feed to distribute heat to the second and third floors. The first floor (perhaps a concrete slab) will receive heat directly from storage. Some water might be removed from storage to provide an insulative air gap when first floor heating is not needed. Storage will be cool in the summer. In the fall, mirrors and thermal collectors could be adjusted to maximize collection. Through the fall the thermal storage would warm gradually to increase the distribution system output with the cooling weather. The collectors would then be adjusted for winter collection to maintain the storage and heat distribution for winter temperatures. In the spring the collectors and/or mirrors will be covered or miss aligned to let the storage system temperature 'coast' to 70 degrees where it will remain throughout the summer.

6. This system is not particularly controlled. It simply collects, stores and slowly releases heat to the structure. Heat collection is only accomplished on sunny days. Insulation will have to be enough to hold much of the heat from month to month, but not season to season. The distribution functions continuously and is only roughly controlled. The distribution system must be carefully designed to heat, but not overheat, the space under typical conditions. Also, the building must be insulated and air tight enough that its losses do not exceed the heating system's capacity. A characteristic of a radiant slab is that as the room temperature declines the heat transfer increases. The distribution is entirely passive. This will provide a failsafe backup heating system. The only moving parts are the pumps, in the collection system, that transfers the hot water from the collectors on the roof to the storage system in the basement.

7. The storage system may be stratified. The top may be 100 deg. F. while the bottom is 50 deg. F. The bottom of the storage will not be insulated. If the collection system fails and the storage system drops to say 45 deg F. the ground will heat the tank and the passive distribution system will heat the building. The building will not freeze.

8. The south side of each apartment will be approximately 30% glass. This will provide additional heat on sunny days to passively bring the space toward room temperature. These windows may be aligned floor to floor with an insulated roll down door to provide additional insulation on winter nights.

9. A Photovoltaic (PV) system with batteries might operate a water source heat pump which would provide fine control of the space temperature year round. The large storage system would be the water source which will be warm in the heating season and cool in the cooling season, thus improving efficiency. This PV system might also run a heat recovery system for bathroom and kitchen exhaust and fresh air to the apartments. The building might be designed to minimize infiltration but not tight enough to trap all moisture. The PV panels for this system would be oriented at 45 degrees to optimize year round collection and double as shading for the windows. If not connected to the grid, excess power would charge the battery. Once the battery was charged additional power would heat the basement storage system. An air source heat pump could also be used in the same way. Excess PV production could be used to heat the thermal mass in the fall and winter, and to maintain temperature in the spring and summer.

10. The core of this design is a low loss building with a large water solar collector, a large low temperature storage system and a small passive distribution system. Other portions of this discussion are standard refinements. The building should be designed with a sufficient and cost effective level of insulation and enough infiltration to dissipate excess moisture. A photovoltaic (PV) powered heat recovery system may supplement this. The main collector would be long, south facing, fixed and oriented toward the winter sun. It may have concentrating mirrors, again oriented for the winter sun. Photovoltaic powered pumps would deliver heated water to the storage system. No grid power would be required for collection. The pumps would modulate based on the insulation thus running faster as more heat is being collected. The storage would be water (and stone?) in the basement. The foundation would be insulated on the outside to include the concrete in the thermal mass. The distribution system would be thermo siphoning radiant slabs. These would be entirely passive and sized to approximate room temperature. Fine temperature control would be accomplished with a heat pump system.

Other features and advantages of the invention are described below.

DESCRIPTION OF THE DRAWINGS

FIG. 2 is a side view cut-away representation of the system shown in FIG. 1. Depicted are a first floor residential unit 1, a second floor residential unit 2, a conditioned space 5 located below the roof, a below-grade thermal storage area 6 located below the first floor residential unit 1, a garage 7, and a mechanical room 8. Located on the roof are an upper flat mirror 22, a middle flat mirror 23, and a lower flat mirror 24, each angled independently to properly reflect incident rays during the winter 11, autumn 12, and summer 13. Those rays are reflected onto a collector 20 and onto a photovoltaic panel 25, both of which are also located on the roof. Additional photovoltaic panels are incorporated into sunshades 32 overhanging the windows of the south side of the building.

FIG. 7 is a side view cut-away representation of the piping of the system. Depicted are a first floor residential unit 1, a second floor residential unit 2, a conditioned space 5 located below the roof, a below-grade thermal storage area 6 located below the first floor residential unit 1, a garage 7, and a mechanical room 8. Located on the roof are a flat plate collector 28 incorporating a photovoltaic panel 51, and a standalone photovoltaic panel 57 located on the surface of the roof. Tanks 53 are placed in the residential units 1,2 and a pump 52 circulates water between the flat plate collector 28, the tanks 53, and a water tank located in the thermal storage area 6. The pump 52 may be powered by the photovoltaic panel 51.

FIG. 8 is a side view cut-away representation of the radiant slab distribution system. Depicted are a first floor residential unit 1, a second floor residential unit 2, and a below-grade thermal storage area 6 located within the residential units 1,2, and pipes 61,62,63 for bringing water from a water tank located in the thermal storage area 6 to the residential units 1,2 and then returning the water to the thermal storage area 6. A concrete slab 64 provides direct conduction of heat to the lower residential unit 1.

FIG. 9 is a side view cut-away representation of yet another embodiment of the system. Within the thermal storage area 6 is a water tank 56 connected by pipes 61,62,63 to bring water to the residential living units 1,2. A pump 52 circulates water through the domestic hot water tanks 53,54 located in the residential living units 1,2. On the roof a flat plate collector 21 receives reflected light from upper, middle, and lower flat mirrors 22,23,24. A mirrored side wall 31 located on the roof prevents concentrated sunlight from being dispersed. A roll-down window covering 33 keeps heat within the residential living units 1,2 during the night. Further piping 71 provides for an excess heat dump located under the garage 7.

FIG. 11 is a side view cut-away representation of yet another embodiment of the system. In this embodiment, the thermal storage area 6 is located directly on ledge 16, with pipes 61,62,63,65 running through the thermal storage area 6 and the residential living unit 1. A flat mirror 27 is positioned on the roof to direct sunlight onto a collector FIG. 12 is a top view cut-away representation of yet another embodiment of the system. The thermal storage area 6 is in communication with an excess heat dump 71 located below the garage. Thermal flows 72 coming from collectors 73 and going to collectors 74 put most of the heat at the perimeter of the building.

DETAILED DESCRIPTION OF INVENTION

The collectors for collecting solar energy will be in an array with each collector oriented south at about 25 degrees above the horizon. This array will be the full length of the building. In one embodiment the length will be 30-40' for two flat apartments, or 60-80' for four. The roof of the building might slope approximately 20 degrees to the north. The collectors will be their length above the roof (i.e., the bottom of eight foot collectors will be eight feet above the roof) to provide room for sunlight to pass under the collectors to a mirror located 20-30 feet behind the collectors, which will reflect light to the back side of the collectors. A second mirror above and behind the collectors reflects sunlight onto the collectors. There are also mirrors east and west to prevent concentrated sunlight from dispersing.

The PV collectors on the south side of the building will be sized such that the collectors will shade the windows from the summer sun and allow the winter sun to shine in the full height of the windows. This shading is a standard passive house concept. These will supply a standard PV battery and control system. Winter sun that falls between the windows will heat the wall, reducing the heat loss for those walls. In another embodiment, the wall might be a ventilated wall to preheat air for the heat exchanger. Thus, in the winter, a percentage of all of the sunlight that hits the building (walls, windows, roof, collectors and mirrors) will be captured and utilized or stored. In yet another embodiment, the space between the windows may incorporate additional flat plate collectors.

In another embodiment one or more stratified hot water storage tanks on the first and second floors will provide domestic hot water for the apartments. Water from the collectors will be pumped from top to bottom through a coil in each tank. Once this tank is warm, heat from the collectors will continue to the basement storage, which is also stratified, again in a loop which runs through the top of the storage system and then through the bottom. With the bottom of the basement storage being cool, say 50 deg. F., the source water for the collectors will be cool and thus collect more heat from the collectors. Again there will be PV collectors amongst the evacuated tube collectors or flat plate collectors, front and back, which will power the pumps. These will be sized to passively control the pumps. The pumps would modulate based on the rate of irradiation, thus running faster as more heat is being collected.

The radiant slab system has a 2 or 3 inch diameter manifold which runs from the top of the basement storage to the second (or third) floor and along the east or west wall with half or three quarters inch tubing run through the floor one or three times to a similar manifold on the opposite wall which drops in the opposite corner (reverse return) to the bottom of the basement storage. Again this will be an entirely passive thermo siphoning system which runs all winter being more effective the colder the space is. In the summer the basement storage will be cool thus stopping the flow. Also lowering the water level will produce an air gap that will insulate the first floor from the water storage and reduce unwanted heating.

Figure 12:
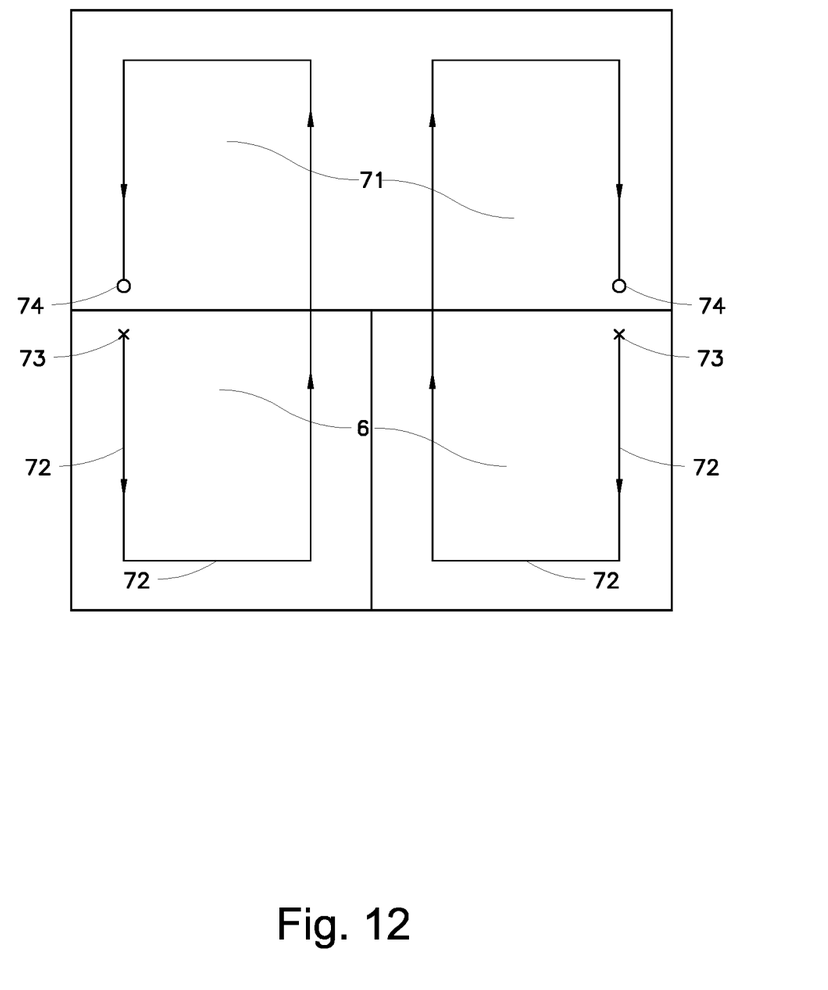

Since the hottest water will be on one side of the building uneven heating may result. Placing heaver carpets and pads on the hot side of the building and little or no carpets and pads on the other side may help balance the unit. In addition, as the most heat will be required on the exterior wall, the collection system might feed the exterior walls first, then under the center of the living space, and finally under the garage. See FIG. 12. There would probably be several parallel loops around each half of the building. Two distribution systems with supplies in the exterior corners (south east and south west) and the returns in the middle of the north wall (of the living space) will put the hottest water near the outside walls of the second floor.

The fine tune heating system, cooling, and ventilation for the building as a whole is powered with the PV system and some battery capacity. The radiant slab functions passively over night and on cloudy days. The heat pump and heat recovery ventilation system works over night on battery, or just during the day on direct PV and battery, or just under direct PV. In a multi-unit building a common heat pump system with a distribution head in each apartment is used. The tenants might have additional heat and cooling systems which might be grid or PV powered. There might also be a common heat exchanger ventilation system. Exhaust air from the baths and kitchens may be used to supply fresh air to the living or bedrooms. If the system is totally PV the supply would be to the living rooms where people are in the day. If the system runs 24/7 on battery or grid power the fresh air might be to the bedrooms where people spend a third of their lives. They would have exhaust and perhaps supply fans to supplement the building heat exchanger ventilation system (forcing more air from one room for a short time through the common system). Individual occupants also might add humidity controls and/or batteries charged from their part of the PV system.

This basic radiant slab and PV powered heat pump combination will provide good temperature control on sunny days. A small battery system will extent this control overnight. A larger battery will serve over short cloudy periods. Longer cloudy periods in the summer are generally not as hot as sunny days so the lack of AC will not be a big problem. Any long hot cloudy period may get uncomfortable. In late spring and early fall temperature control is not much of a problem in the upper United States. In late fall, winter, and early spring the radiant slab will provide much of the needed heating. On warm sunny days the heat pump will function in AC mode to control the temperature. In long periods of cold cloudy weather, though, this concept will fail without supplemental heat, resulting in the building not being comfortable for most people, dropping to the 60s or perhaps even to the high 50s. Again, it will not freeze. This system simply takes advantage of free low hanging fruit.

Some users may be comfortable with this and accept some temperature fluctuation for the sake of environmental protection. Users who go south for the winter would be confident that their homes are safe from freezing. Optional connectivity to the grid ensures this.

A supplemental boiler might put heat into the basement near the supply risers for the radiant slab, or individual occupants may use grid power to run their own heat pumps or small electric baseboards. These heat pumps would also probably have to be water source as air sourced heat pumps also do not work well in the coldest weather.

This system will work best during the day. It will provide fine temperature control, fresh air, pleasant sunlight and perhaps humidity control for free during the day.

In its most basic form, the above-described system comprises one or more solar energy collectors, one or more sunlight concentrating mirrors, one or more photovoltaic panels, a heat mass storage area, and pipes to provide movement of water to distribute heat energy throughout said building. The one or more sunlight concentrating mirrors may be a series of flat mirrors, each oriented at a different angle than the other mirrors, such that at least some of the incident sun rays striking the mirrors at different angles, because of changing solar position over different times of day and over different seasons, are reflected onto the solar energy collectors and the photovoltaic panels. In an alternative embodiment, the multiple flat mirrors are replaced by a concave mirror. The differing curvature of the reflective surface of the concave mirror serves the same purpose as the differing angles of the multiple flat mirrors.

Various different variants are also contemplated. In one variant, sunshades are located over the south facing windows of the building. These sunshades may incorporate photovoltaic panels. The sunshades are positioned to block sun rays during summertime and to allow sun rays to pass through the windows during wintertime. In another variant, the solar energy collectors are evacuated tube collectors. In yet another variant, the solar energy collectors are flat plate collectors. In yet another variant, the flat plate collectors incorporate photovoltaic panels.

The heat mass storage area may be filled with gravel, and it may further incorporate a thermal storage tank, with the thermal storage tank being filled with water. The water acts as a heat sink, and also may be easily moved about the building through conduits, such as pipes. Individual hot water tanks may be located within the residential living units of the building, in communication with the thermal storage tank by the pipes. Pumps may be used to help circulate the water. These pumps may be powered by electricity generated by the photovoltaic panels. In an alternative embodiment, rather than using water as a heat sink, a concrete slab located between the first floor residential units and the heat mass storage area may be used. This concrete slab provides direct conduction of heat to the first floor residential units. Excess heat can be piped to an area under the garage.

The invention is not limited to what is described above. Other embodiments not specifically set forth herein are also within the scope of the following claims, whereby modifications and variations can be made to the disclosed embodiments of the present invention without departing from the subject or spirit of the invention.

I claim:

1. A system for collecting solar energy to be stored and distributed in a multi-unit building, said multi-unit building comprising at least one first floor residential unit, a basement area located beneath the at least one first floor residential unit, and a roof capable of supporting one or more solar energy collectors, one or more sunlight concentrating mirrors, and one or more photovoltaic panels, said energy to be used for heat and electricity, said system comprising one or more solar energy collectors,
one or more sunlight concentrating mirrors,
one or more photovoltaic panels, a heat mass storage area, said heat mass storage area located in said basement area, and pipes to provide movement of water between at least two of said one or more solar energy collectors, one or more sunlight concentrating mirrors, one or more photovoltaic panels, and heat mass storage area to distribute heat energy throughout said building.

2. The system of claim 1 wherein said multi-unit building further comprises at least one second floor residential unit, and a garage.

3. The system of claim 1 wherein said one or more sunlight concentrating mirrors comprises an upper flat mirror, a middle flat mirror, and a lower flat mirror, each said flat mirror angled independently from each other flat mirror such that incident sun rays striking said mirrors are reflected onto the one or more solar energy collectors, whereby differing orientations of said mirrors serve to accommodate different angles of sun rays caused by changing solar position over different times of day and over different seasons.

4. The system of claim 1 wherein said one or more sunlight concentrating mirrors comprises an upper flat mirror, a middle flat mirror, and a lower flat mirror, each said flat mirror angled independently from each other flat mirror such that incident sun rays striking said mirrors are reflected onto the one or more photovoltaic panels, whereby differing orientations of said mirrors serve to accommodate different angles of sun rays caused by changing solar position over different times of day and over different seasons.

5. The system of claim 1 wherein said one or more sunlight concentrating mirrors comprises a single concave mirror, such that incident sun rays striking different portions of said concave mirror are reflected onto the one or more solar energy collectors, whereby differing curvatures of portions of reflective surfaces of said concave mirror serve to accommodate different angles of sun rays caused by changing solar position over different times of day and over different seasons.

6. The system of claim 1 wherein said one or more sunlight concentrating mirrors comprises a single concave mirror, such that incident sun rays striking different portions of said concave mirror are reflected onto the one or more photovoltaic panels, whereby differing curvatures of portions of reflective surfaces of said concave mirror serve to accommodate different angles of sun rays caused by changing solar position over different times of day and over different seasons.

7. The system of claim 1 wherein said multi-unit building further comprises one or more south facing exterior windows for the one or more first floor residential units, with said system further comprising one or more sunshades located over the one or more exterior windows, said sunshades incorporating photovoltaic panels thereon, whereby said sunshades are positioned to block sun rays during summertime and to allow sun rays to pass through said windows during wintertime.

8. The system of claim 2 wherein said multi-unit building further comprises one or more south facing exterior windows for the one or more second floor residential units, with said system further comprising one or more sunshades located over the one or more exterior windows, said sunshades incorporating photovoltaic panels thereon, whereby said sunshades are positioned to block sun rays during summertime and to allow sun rays to pass through said windows during wintertime.

9. The system of claim 1 wherein the one or more solar energy collectors are evacuated tube collectors, with each said evacuated tube collector oriented horizontally.

10. The system of claim 1 wherein the one or more solar energy collectors are flat plate collectors.

11. The system of claim 10 wherein the one or more flat plate collectors incorporate thereon photovoltaic panels.

12. The system of claim 1 wherein the heat mass storage area comprises a thermal storage tank, with said thermal storage tank being filled with water, wherein the pipes are in communication with said thermal storage tank and with the one or more solar energy collectors, such that water flowing through said pipes circulates between the one or more solar energy collectors and the thermal storage tank.

13. The system of claim 12 further comprising one or more hot water storage tanks, and one or more pumps, wherein said one or more hot water storage tanks are located within the one or more first floor residential units and are in communication with the thermal storage tank by the pipes, and the one or more pumps are used to circulate water between the one or more solar energy collectors, said tanks, and the thermal storage tank.

14. The system of claim 13 wherein the one or more pumps are powered by electricity generated by the one or more photovoltaic panels.

15. The system of claim 2 wherein the heat mass storage area comprises a thermal storage tank, with said thermal storage tank being filled with water, wherein the pipes are in communication with said thermal storage tank and with the one or more solar energy collectors, such that water flowing through said pipes circulates between the one or more solar energy collectors and the thermal storage tank.

16. The system of claim 15 further comprising one or more hot water storage tanks, and one or more pumps, wherein said one or more hot water storage tanks are located within the one or more second floor residential units and are in communication with the thermal storage tank by the pipes, and the one or more pumps are used to circulate water between the one or more solar energy collectors, said tanks, and the thermal storage tank.

17. The system of claim 16 wherein the one or more pumps are powered by electricity generated by the one or more photovoltaic panels.

18. The system of claim 1 further comprising a concrete slab located between the one or more first floor residential units and the heat mass storage area, whereby said concrete slab provides direct conduction of heat to the one or more first floor residential units.

19. The system of claim 2 further comprising pipes for moving excess heat from the heat mass storage area to an area located below the garage.

* * * * *